INVENTORS
J. T. CLANCEY
J. A. PHINNEY
T. J. REGAN
E. J. WASP
BY Stanley J Price
their ATTORNEY

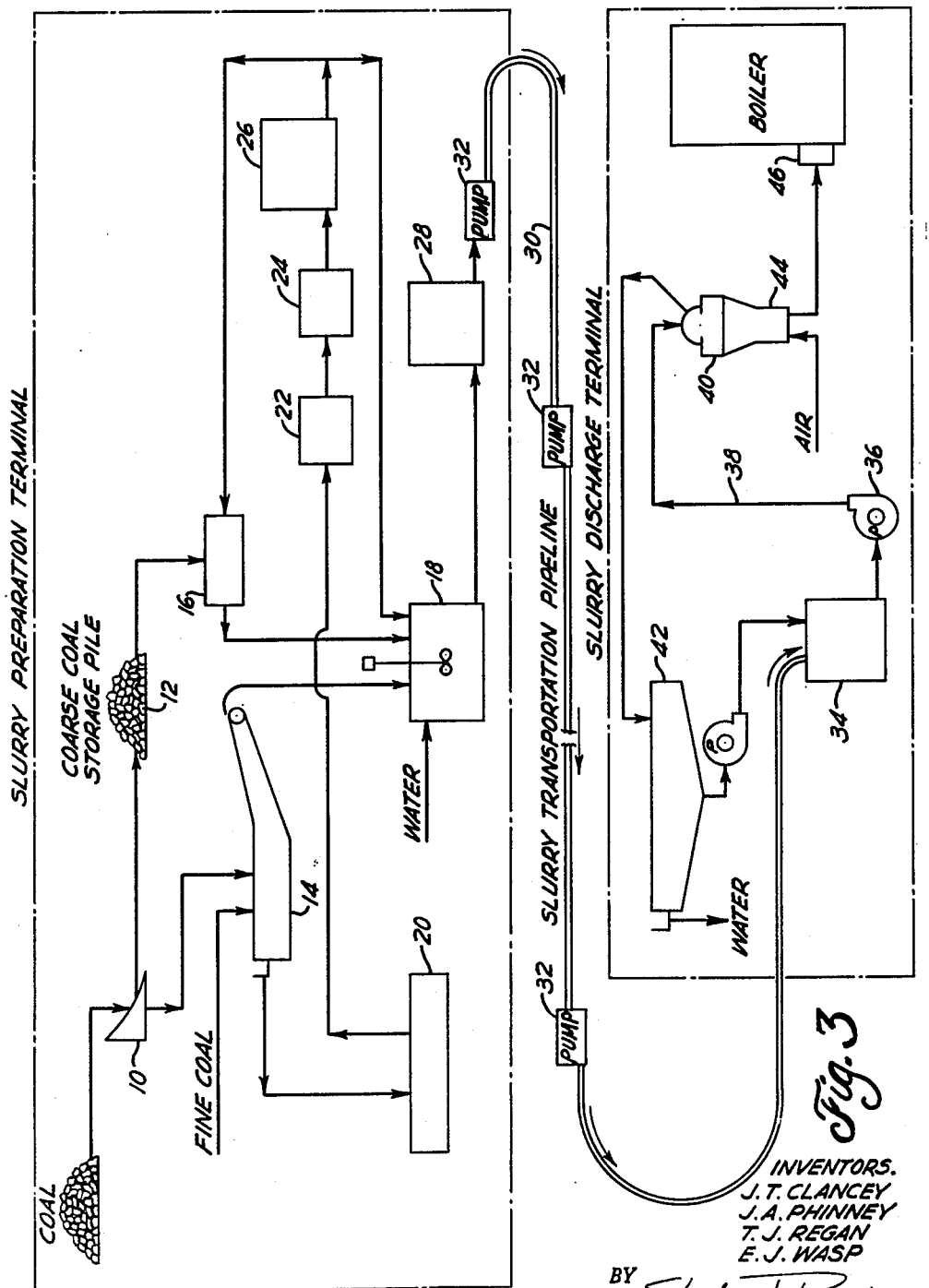

United States Patent Office 3,168,350
Patented Feb. 2, 1965

3,168,350
TRANSPORTATION OF COAL BY PIPELINE
John A. Phinney, James T. Clancey, Thomas J. Regan, and Edward J. Wasp, Pittsburgh, Pa., assignors to Consolidation Coal Company, Pittsburgh, Pa., a corporation of Pennsylvania
Filed Aug. 29, 1961, Ser. No. 134,631
8 Claims. (Cl. 302—14)

This invention relates to the art of transporting coal with water through pipelines. More particularly it relates to a method of preparing a mixture of particulate coal and water and transporting the mixture at reduced transport energy through a pipeline to a distant location.

A recently discovered process for transporting coal as an aqueous slurry has made it possible to now transport coal over long distances through a pipeline. In reliance on this process, a commercial pipeline has been constructed to transport coal from a mine in southern Ohio to a consumer along the shores of Lake Erie—a distance of 108 miles. Several million tons of coal have been successively transported over this distance through this commercial pipeline at a substantial savings in transportation costs.

The process employed to transport the coal as an aqueous slurry through this commercial pipeline is set forth in U.S. Patent #2,791,471 entitled "Transportation of Coal by Pipeline." The process described and claimed in the aforementioned patent specifies that the coal particles mixed with the water have a spectrum of sizes and a nominal top size in the range of 6 to 28 mesh Tyler standard screen series and have less than 25 percent by weight of particles having a size greater than 14 mesh. The coal particles having the above size distribution and nominal top size are mixed with water to prepare a slurry comprising 35–55 percent by weight of the coal particles and the remainder water. This slurry is pumped through a long distance pipeline at a linear velocity of between 4 to 7 feet per second and recovered at the delivery end of the pipeline. A given amount of energy is required to transport a slurry of coal particles and water under the above described conditions.

The above described process, although both successful and commercially feasible as evidenced by the successful transportation of several million tons of coal, has certain properties that impose substantial limitations on its use. One limitation of a slurry prepared according to the above named patent is the amount of energy that must be expended to convey the slurry through a long distance pipeline. Although the amount of energy that must be expended to convey the slurry is substantially more favorable than other conventional means of transportation, it is still quite high. In addition, the slurry prepared according to the above patent is an unstable slurry in that under static conditions the coal particles quickly settle out of the slurry and pack as a highly immobile mass.

We have discovered a process which is an improvement over the process described and claimed in the above mentioned patent in that the energy to convey the slurry is reduced substantially. We have discovered by blending in a prescribed manner two quantities of coal each having a different spectrum of particle sizes and mixing the blended coal particles with water we obtain a slurry that requires less energy to transport the slurry through a long distance pipeline. In fact, the energy requirements of the slurry prepared from the blended coal particles is less than the energy requirements to transport slurries prepared from either of the two quantities having different spectrum of sizes alone. In other words, we have discovered by blending two slurries having different spectra of coal particles, both with high transport energy requirements, we obtain a slurry which has transport energy requirements less than either of the two slurries originally employed in the blend. It is now possible to transport a larger amount of coal at the same transport energy as previously required or, alternatively, to transport by our process the same amount of coal at lower transport energy requirements. This improved slurry is obtained by specifically controlling the particle size and the distribution of the various sized particles.

For example, we have discovered by blending relatively coarse coal particles having a spectrum of sizes and a nominal top size of about 4 mesh with a spectrum of relatively fine coal particles having a substantial quantity of particles smaller than 325 mesh, a slurry may be obtained which requires less transport energy to convey the slurry through a pipeline at a given velocity and at a given concentration than the transport energy required to transport a slurry of either the coarse coal particles or the fine coal particles at the same concentation of coal particles by weight and at the same velocity.

In addition to the improved reduced transport energy requirements of this slurry, we have discovered that a more stable slurry is obtained.

The primary object of this invention therefore is to reduce the energy required to convey coal as a coal-water mixture through a pipeline.

Another object of this invention is to provide a coal-water mixture that is statistically stable.

Another object of this invention is to provide a system for preparing a mixture of particulate coal and water that requires reduced transport energy to convey the mixture at a given velocity through a pipeline to a distant location.

A further object of this invention is to provide an over-all system for preparing a mixture of particulate coal and water, transporting the mixture through a pipeline to a distant location at reduced transport energy requirements, and thereafter preparing the coal particles for conversion at the distant location.

These and other objects and advantages of this invention will become more apparent from the drawings, the following specification and the appended claims.

The invention is best described with reference to the acompanying drawings, in which:

FIGURE 3 is a schematic illustration of a coal pipeline transportation system.

Throughout this specification the terms "coal-water mixture" and "slurry" will be used interchangeably. The term "low energy slurry" is intended to designate a coal-water slurry that requires a reduced amount of energy to convey the slurry as compared with a "high energy slurry" having substantially the same weight percent concentration of coal. The term "unstable slurry" is intended to designate a coal-water slurry that is statically unstable in that the coal particles quickly settle out of the water carrier under static conditions. The term "stable slurry" is intended to designate a coal-water slurry that is statically stable in that the coal particles do not under static conditions settle out to form a highly immobile mass. The stable slurry under static conditions retains its fluidity.

It will be appreciated by this invention that it is now possible to obtain either a low energy slurry, or a stable slurry, or a slurry having both of the desired properties of low energy and stability as is illustrated in the preferred embodiment. The term "normal size distribution" is intended to designate the size distribution of comminuted coal particles that follow a statistical distribution by weight according to a conventional distribution curve.

One of the principal factors that influence the economics and operability of any coal pipeline transportation system is the energy required to convey the coal-water slurry at a given velocity from one location to another through the pipeline. This energy bears a direct relation to the resistance to flow of the slurry and may be called, for convenience, the transport energy required to convey a given concentration by weight of coal particles in water through a pipeline at a given velocity. The transport energy may be expressed as the pressure drop experienced by the coal-water slurry per given length of pipeline. Conventional units for expressing this pressure drop are pounds per square inch per mile of pipeline.

Figure 1:
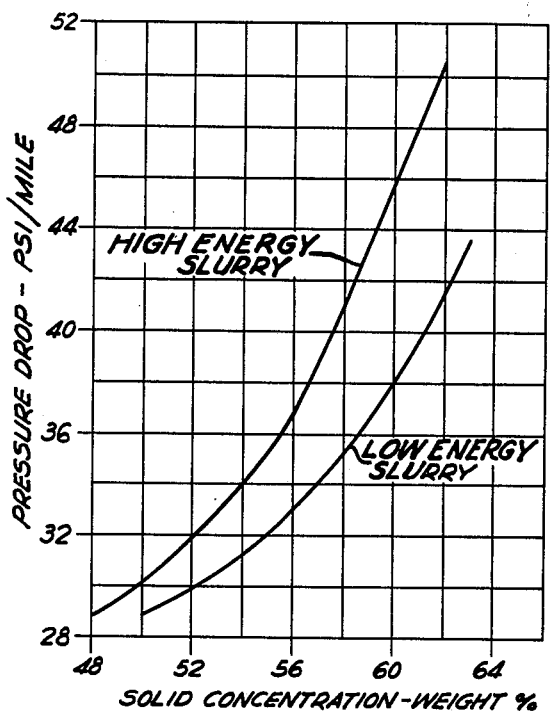
FIGURE 1 is a graphical comparison of the transport energy required to transport both high energy and low energy slurries at various weight percent concentrations of coal particles in water.

FIGURE 1 is a graphical illustration of the transport energy required to convey at different concentrations a typical high energy slurry and the improved low energy slurry of this invention. The high energy and low energy slurries of FIGURE 1 have the following approximate spectrum of sizes and size distribution:

| Tyler Mesh | Weight Percent of Feed Solids | |
| --- | --- | --- |
| | High Energy Slurry | Low Energy Slurry |
| +14 | 0.3 | 8.0 |
| 14 x 28 | 28.1 | 19.5 |
| 28 x 48 | 30.9 | 17.0 |
| 48 x 100 | 19.0 | 12.8 |
| 100 x 200 | 8.1 | 11.5 |
| 200 x 325 | 3.9 | 5.6 |
| Through 325 | 9.6 | 25.6 |

The transport energy in FIGURE 1 is expressed as the pressure drop in pounds per square inch per mile experienced by a slurry in a 12 inch pipe when conveyed at a velocity of about 6 feet per second. The particles in the high energy slurry have a normal size distribution and a nominal top size of about 14 mesh. The low energy slurry, on the other hand, is a blend of two spectra of particle sizes, one a relatively coarse fraction, and the other a relatively fine fraction. The blend of coal particles in the low energy slurry includes a substantial fraction of coal particles having a size less than 325 mesh.

It can be seen from FIGURE 1 that the transport energy required to convey a high energy coal-water mixture having 54 percent by weight coal is about 34 pounds per square inch per mile. A low energy slurry requiring the same transport energy has a concentration of 57 percent by weight coal particles. Therefore, it is possible, as illustrated in FIGURE 1, to increase the solids concentration of the slurry by about 3 percent by weight of coal and to convey this more concentrated slurry at the same transport energy as a high energy slurry of lower concentration. The savings in transport energy between a low energy and a high energy slurry is increased as the solids concentration of the slurry is increased. This will be appreciated in that the transport energy curves for the low energy and high energy slurries diverge at higher concentrations. For example, to transport a high energy slurry at 60 percent solids concentration requires transport energy equivalent to about 45 pounds per square inch per mile. When a low energy slurry at the same concentration is transported through the same size pipe at substantially the same velocity, the transport energy required is about 38 pounds per square inch per mile, a difference of about 7 pounds per square inch per mile. The principle to be obtained from the above discussion is that with our invention it is now possible to reduce substantially the transport energy required to convey the same amount of coal through a pipeline or alternatively to transport an increased amount of coal at the same transport energy.

Another improved property of the low energy coal-water slurry when compared with the high energy coal-water slurry taught in the aforementioned patent is its static stability. The coal particles in the high energy slurry quickly settle out of the water carrier under quiescent conditions and form a bed of coal particles with a supernatant layer of clear water. It is believed, because of the rapidity with which the coal particles settle out of the water carrier and form a bed, the large particles settle adjacent the bottom of the bed and the finer particles settle adjacent the top portion of the bed and a size gradient is formed. The bed of coal particles in a settled high energy slurry is immobile and highly resistant to flow. To again resuspend the settled coal particles of a high energy slurry in the water carrier requires a substantial amount of energy. Thus, when the high energy slurry is permitted to stand for any substantial period of time under quiescent conditions a substantial amount of energy is required to remove the coal particles from the container either by a mechanical means or by again resuspending the coal particles in the water carrier. It is apparent that the static instability of a high energy coal-water slurry places substantial limitations on its storage and use.

In comparison with the unstable high energy slurry, the low energy slurry of the present invention, although it settles under quiescent conditions to form a bed of coal particles and a supernatant layer of water, does not form an immobile mass. The bed of coal particles in a settled low energy slurry is in effect a highly concentrated coal-water slurry. The coal particles in a low energy slurry on settling do not have the tendency to form a size gradient in the settled bed as does a high energy slurry. The fine coal particles remain distributed throughout the entire bed. It is believed that the distribution of the fine coal particles throughout the settled bed contributes substantially to the mobility and flowability of the settled bed. In fact, it has been discovered that the supernatant layer of water may be decanted from the settled bed of coal particles to increase the concentration of the slurry to between about 65 and 70 percent coal particles by weight. This highly concentrated slurry may be removed from a container in a manner similar to that of a heavy viscous liquid. For example, the highly concentrated material will flow by gravity from an opening adjacent the bottom of the container. It is apparent with this highly desirable property of static stability the low energy stabilized slurry is no longer restricted by the limitations of a high energy unstable slurry and new methods of transportation not heretofore possible may be employed.

While applicants do not wish to be bound by any of the theory that follows, it is believed a discussion of the effect of the size and relative proportions of the various sized coal particles in both high energy and low energy slurries will contribute to an understanding of the reduced transportation energy requirements of the low energy slurry prepared in accordance with the above described invention and its improved stability characteristics as compared with the high energy slurry previously discussed.

It was discovered at predetermined velocities, pipe size diameter, and concentrations that coal-water slurries having particles of normal size distribution had different transport energy requirements. Slurries having relatively coarse particles had high energy requirements. Slurries having relatively fine coal particles also had high energy requirements. The optimum normal size distribution wherein minimum transport energy requirements were present was a slurry having coal particles of a nominal top size of about 14 mesh and a normal size distribution. These energy requirements are graphically illustrated in FIGURE 1 by the curve designated "High Energy Slurry." As previously discussed, the slurry prepared of coal particles having a normal size distribution and a nominal top size of 14 mesh also had undesirable stability characteristics.

It was subsequently discovered if relatively coarse coal particles having a normal size distribution were blended with fine coal particles having a substantially normal size distribution in predetermined proportions, the energy requirements were substantially reduced. In addition, desirable static properties where obtained.

For example, it was found that an 8 mesh x 0 fraction of coal particles having a substantially normal size distribution when blended with a predetermined amount of fine coal particles, these being preferably coal particles having a mean particle size diameter one-tenth or less than the size of the mean particle diameter of the 8 mesh x 0 coarse coal particles, produced a slurry having an unobviously low transport energy requirement. It was further discovered that the resulting slurry of this blended material has desirable static properties not present in a slurry including coarse coal particles having a normal size distribution.

Figure 2:
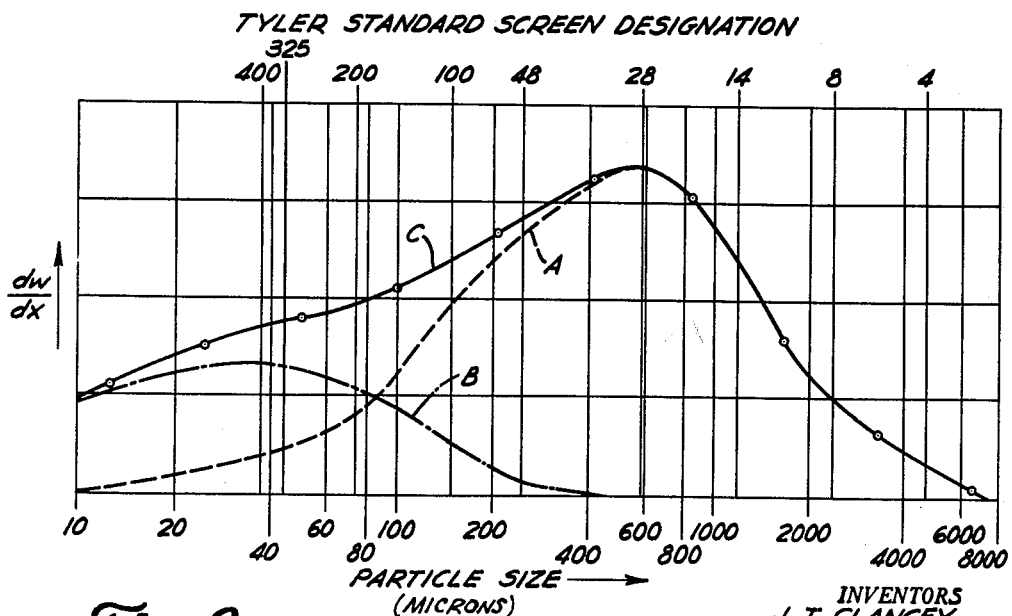
FIGURE 2 is a graphical illustration of the blending of the various sized coal particles and graphically illustrates the statistical distribution of the coal particles in the coarse fraction, the fine fraction, and the resulting blend.

FIGURE 2 graphically illustrates the blending of the various particles and is a plot of the statistical distribution of the coal particles in the coarse fraction, the fine fraction and the resulting blend. In FIGURE 2 the function $$\frac{dw}{dx}$$

is plotted in arbitrary units against X where W is the weight of the solids and X is the particle size of the solids. The dash line A represents the distribution curve for the 8 mesh x 0 coarse coal particles. The dash-dot line B indicates the distribution curve for the fine coal particles. The solid line C is the sum of the blended coarse coal and fine coal particles and represents a typical distribution of our improved low energy stabilized slurry. Approximately 70 percent of the coarse material is blended with approximately 30 percent of the finer material. It should be noted from FIGURE 2 that the mean particle size diameter of the fine material, indicated by the horizontal position of the maximum vertical height of line B, is less than one-tenth the size of the mean particle diameter of the coarse material indicated by the horizontal position of the maximum vertical height of line A. It will be appreciated that material having a size smaller than the mean particle size diameter, that is, smaller than one-tenth the size of the mean particle size of coarse material, may also be employed. It is preferred, however, to have fine coal particles which are of a size larger than colloidal size.

The principle to be obtained from the above discussion is that it is now possible by blending coarse coal particles and fine coal particles in predetermined proportions to reduce the transport energy requirements of of a coal-water slurry and also to obtain desirable static properties.

The following is an example of how transport energy requirements can be reduced by blending fine coal particles with coarse coal particles. 75.6 tons of coal having a substantially normal size distribution, a nominal top size of about 4 mesh × 0, and about 12.4 percent by weight −325 mesh material were mixed with water to form a coal-water slurry having a concentration of about 60 percent by weight coal. The slurry was introduced into a 12 inch pipeline loop and circulated therearound at a velocity of about 5.15 pounds per second. The pressure drop per thousand feet of pipe for the slurry having a substantially normal size distribution and a nominal top size of 4 mesh × 0 was about 8.8 pounds per square inch per 1000 feet of pipe. The slurry was circulated in the loop for a period of about 16 hours in a manner that the coal particles in the slurry were reduced in size due to attrition. After 16 hours there was a reduction in the pressure drop from 8.8 to about 5.43 pounds per square inch per 1000 feet of pipe. The size consist of the coal particles in the slurry at this reduced pressure drop was as follows: 19.7 percent by weight coal particles having a size greater than 14 mesh; 59.2 percent by weight coal particles having a size which pass through a 14 mesh screen and are retained on a 325 mesh screen; and 21.1 percent by weight particles which pass through a 325 mesh screen. It should be noted that the −325 mesh material increased from 12.4 percent in the original feed material to 21.1 percent in the attrited material. The attrited slurry having the above size consist was again circulated through the loop under attriting conditions for a total of 39 hours at which time the pressure drop increased to approximately 11 pounds per square inch per 1000 feet of pipe. A sample of the slurry was taken and the coal particles in the slurry had the following size consist and particle size distribution:

17.4% by weight +14 mesh
51.4% by weight 14 × 325 mesh
31.2% by weight −325 mesh The above indicates that, at a predetermined velocity, solids concentration and pipe size, an excess of fine material in the slurry will again increase the transportation energy requirements to a point equal to or above that of a coarse material having a normal size distribution.

In order to determine whether the over-attrited material, that is, the material containing an excessively large amount of fine coal particles, could be successfully blended with coarse coal particles having a normal size distribution, the following additional procedure was followed. A portion of the over-attrited slurry having the last defined size consist and size distribution was mixed with a slurry having coal particles with a nominal top size of about 4 mesh and a normal size distribution. The blended material was prepared so that the size consist and size distribution was substantially as follows:

20.4% by weight +14 mesh
58.9% by weight 14 × 325 mesh
20.7% by weight −325 mesh Sufficient water was added to the above blend to prepare a slurry having approximately 61.7 percent by weight coal. This blended slurry was again transported through the 12 inch pipe loop and the measured pressure drop over a one thousand feet test section of pipe was approximately 7.08 pounds per square inch. It should be noted that the concentration of the blended slurry was approximately 2 percent higher than the moderately attrited slurry so that the slight increase in pressure drop is expected.

The principle to be obtained from the above example is that it is possible to blend a slurry having an excessive amount of fine particles and high transportation energy requirements with a slurry of relatively coarse particles having a normal size distribution and high transportation energy requirements in predetermined proportions and obtain a coal-water slurry that has transport energy requirements less than either of the fractions employed in the blend.

A preferred method of preparing the low energy stabilized slurry of this invention for transportation over long distances through a pipeline is schematically set forth in FIGURE 3. At the slurry preparation terminal, which is preferably located adjacent to a coal mining area or a coal cleaning plant, the coal having a size of about ⅜ × 0 is screened on a screen 10 having openings of 8 mesh Tyler standard screen. The oversize product, that is, the +8 mesh coal, is transported by mechanical means to a coarse coal storage pile 12.

The coal that passes through screen 10 is transported to a storage means 14 such as a drag tank or the like. A separat suitable source of fine coal is introduced into the drag tank 14 so that the coal particles in the drag tank have an approximate size distribution set forth in Table I under the heading "Coarse Coal."

Table I

| Tyler Mesh | Coarse Coal | Coarse Coal Crusher Product | Coarse Coal Blend | Fine Coal | Coarse Plus Fine Coal Blend |
|---|---|---|---|---|---|
| 4 | 0.0 | 1.5 | 0.8 | | 0.5 |
| 8 | 0.0 | 8.8 | 4.8 | | 3.3 |
| 14 | 2.2 | 14.7 | 11.9 | | 8.1 |
| 28 | 20.2 | 24.0 | 22.3 | Tr | 15.3 |
| 48 | 30.3 | 17.9 | 23.4 | 0.6 | 16.2 |
| 100 | 25.5 | 11.2 | 17.7 | 5.5 | 13.4 |
| 200 | 12.0 | 6.5 | 9.0 | 13.2 | 10.5 |
| 325 | 3.6 | 3.0 | 3.2 | 16.8 | 7.1 |
| −325 | 6.2 | 7.4 | 6.9 | 63.9 | 25.6 |

The +8 mesh coal from the coarse coal storage pile 12 is introduced into a comminuter or crusher 16. A source of fine coal slurry is cocurrently introduced into the crusher 16 to facilitate crushing of the coarse coal particles as well as its transportation through and away from the crusher. The product withdrawn from the coarse coal crusher 16 has a typical size distribution as set forth in Table I under the heading "Coarse Coal Crusher Product."

The products of the crusher 16 and the drag tank 14 are introduced into a mixing tank 18. The overflow from the drag tank 14 which contains −100 mesh coal particles is collected in a tank 20. The −100 mesh particles are transported from the tank 20 as a slurry to a coarse comminuting means 22 where the size of the −100 mesh material in the slurry is reduced. The product of the coarse comminuting means 22 is then introduced into a fine comminuting means 24 which may be a conventional ball mill or the like. The coal particles are reduced in the fine comminuting means 24 so that there is a substantial quantity of particles having a size less than 325 mesh Tyler standard screen. A typical size consist of the particles in the slurry leaving the fine coal comminuting means 24 is set forth in Table I under the heading "Fine Coal."

A storage means 26 is provided for the slurry product of the fine coal comminuting means 24. The slurry product of fine coal comminuting means 24 will hereinafter be called, for convenience, a fine coal slurry. A portion of the fine coal slurry withdrawn from storage tank 26 is introduced into the coarse coal crusher 16. It has been found by cocurrently introducing fine coal slurry with the coarse coal particles in crusher 16 the efficiency of the crushing operation is improved substantially since the coarse coal particles are now comminuted in a fluid medium. A second stream of the fine coal slurry is introduced into mixing tank 18. A source of water is also provided in mixing tank 18. Suitable control means are provided throughout the slurry preparation plant so that a blend of coarse material introduced into mixing tank 18 from drag tank 14 and crusher 16 has an approximate size distribution set forth in Table I under the heading "Coarse Coal Blend."

A sufficient amount of fine coal slurry is combined with the coarse blend so that the blended material has a size distribution set forth in Table I under the heading "Coarse Plus Fine Coal Blend."

Cocurrently with the blending of the coarse and fine coal particles, sufficient water is added to the mixing tank 18 to provide a stabilized slurry having approximately 57 percent coal by weight and the remainder water. The stabilized slurry prepared in mixing tank 18 is transported to a stabilized slurry storage tank 28.

The low energy stabilized slurry is withdrawn from storage tank 28 and introduced into a slurry transportation pipeline 30. The low energy stabilized slurry is transported from the slurry preparation terminal through the slurry transportation pipeline at a suitable velocity preferably in turbulent flow, for example, between 3 and 6 feet per second. A plurality of pumps 32 are provided in the pipeline 30 to impart the necessary transportation energy to the low energy stabilized slurry to convey the same through the long distance pipeline.

At the discharge terminus the low energy stabilized slurry is introduced into a slurry storage tank 34 where, if desired, the slurry may be maintained under quiescent conditions and the supernatant layer of water decanted therefrom. The slurry from storage tank 34 is transported by means of pump 36 through a conduit 38 to a dewatering means 40 which may be a filter, centrifuge or the like. The effluent or water phase of the product withdrawn from the dewatering means 40 is conveyed to a flocculator or clarifier 42. The approximate solids concentration of the effluent is about 2 percent solids. The solid phase, that is, the coal particles separated from the water in dewatering means 40, is then introduced into a comminuting means 44 which may be a conventional bowl mill, pulverizer or the like. If desired, air at an elevated temperature can cocurrently be introduced into the comminuting means 44 to further reduce the moisture of the coal particles. The product withdrawn from the bowl mill 44 has a size consist wherein substantially all of the particles are of a size less than 200 mesh Tyler standard screen and a moisture content of between 12 and 20 percent depending upon the degree of drying experienced within bowl mill 44. The product withdrawn from bowl mill 44 is then introduced into a conventional pulverized coal burner 46 where combustion takes place.

It should be understood that the above description is a preferred embodiment of a coal pipeline transportation system with its preparation facilities and dewatering facilities. It will be appreciated that this embodiment is shown for purposes of illustration and that the invention may be modified and embodied in other forms without departing from the scope of the appended claims.

One of the desirable advantages of the above described low energy stabilized slurry is the manner in which the delivery of the slurry to the dewatering terminus can be controlled. As described in U.S. Patent 2,920,923 entitled "Slurry Transportation System," the procedure used for transporting coal as an unstable slurry through a long distance pipeline is as follows. Initially the pipeline is filled with water and maintained in this condition until transportation of the slurry therethrough is commenced. When a quantity of coal is required at the discharge terminus, the preparation terminus is notified and a batch of slurry is prepared. A quantity of pseudo fluid for use as a cap and chaser is also prepared. First a portion of the pseudo fluid is introduced into the pipeline and displaces an equivalent volume of water contained therein. Following the cap of pseudo fluid the slurry is introduced into the pipeline and conveyed to the discharge terminus at a velocity of between 4 and 7 feet per second. Once the slurry is introduced into the pipeline, the flow through the pipeline is not interrupted. The flow velocity of the slurry is maintained well in the turbulent region so that the mixing action during flow uniformly distributes the coal particles throughout the water carrier. After the batch of slurry, which may be equivalent to the quantity of coal required by the discharge terminus, is introduced into the pipeline, the remaining pseudo fluid follows as a chaser. It should be noted that the cap, slurry, and chaser displace the water contained in the pipeline. After the chaser has been introduced, a sufficient quantity of water is introduced into the pipeline to displace the slurry and the chaser. Coal is thus supplied to the discharge terminus in accordance with the cyclic demands of the coal conversion units. After each batch of slurry, the pipeline is again filled with water and maintained in this condition until the above described procedure is repeated to deliver another quantity of slurry to the dewatering terminus. It was found impractical to store the slurry within the pipeline under quiescent conditions.

With the desirable static properties of the stable slurry, a new and improved method of deliverying intermittent or periodic quantities of coal to the dewatering terminus is possible. On initial start up with the new stabilized slurry the water in the pipeline is displaced with first a cap of pseudo fluid as taught in Patent #2,920,923. The cap is followed by stabilized slurry until all the water and the cap are displaced in the pipeline with stabilized slurry. The slurry may then be transported through the pipeline at a predetermined velocity until the periodic demands of the dewatering terminus are satisfied. The flow of slurry through the pipeline is then stopped with an inventory of slurry in the pipeline. The stabilized slurry can be maintained under quiescent conditions in the pipeline without substantial particle size segregation and without the coal particles packing and forming an immobile mass. The stabilized slurry retains its flow characteristics and resumption of transportation through the pipeline may be easily commenced. Therefore, a continuous inventory of stabilized slurry is maintained in the pipeline and little, if any, delay is present between the demand for the slurry at the discharge terminus and its delivery. The pipeline, in effect, now serves as a storage means for a substantial quantity of coal which may be delivered on short notice in a manner similar to liquid fuels. If desired, cyclic movements of the slurry within the pipeline may be accomplished to again redistribute the coal particles throughout the water carrier. With this method of transporting coal as a coal-water slurry, the storage facilities at the discharge terminus may be reduced substantially.

According to the provisions of the patent statutes, we have explained the principle, preferred construction and mode of operation of our invention and have illustrated and described what we now consider to represent its best embodiment. However, we desire to have it understood that, within the scope of the appended claims, the invention may be practiced otherwise than as specifically illustrated and described.

We claim:

1. A system for transporting coal to distant places through a pipeline as a coal-water slurry which comprises
   (a) obtaining relatively coarse coal particles having a spectrum of sizes and about 25 percent by weight of a size larger than 14 mesh Tyler standard screen series, said coarse coal particles when mixed with water to form a slurry having a given concentration of coal particles by weight and when transported at said given concentration through a pipeline at a given velocity will have a first pressure drop per unit length of pipeline,
   (b) obtaining relatively fine coal particles having at least 20 percent by weight of a size that is smaller than 325 mesh Tyler standard screen, said fine coal particles when mixed with water to form a slurry of said same concentration of coal particles by weight and when transported at said same concentration through said pipeline at said same velocity will have a second pressure drop per unit length of pipeline,
   (c) blending said coarse coal particles and said fine coal particles so that said blended product when mixed with water to form a slurry of said same concentration of coal particles by weight and when transported at said same concentration through said pipeline at said same velocity will have a third pressure drop per unit length of pipeline which is less than either said first or said second pressure drop,
   (d) preparing a slurry of said blended product and water comprising at least 50 percent of said blended product of coal particles in water,
   (e) pumping said slurry through a long distance pipeline, and
   (f) recovering said slurry from the delivery end of said pipeline.

2. A system for transporting coal to distant places through a pipeline as a coal-water slurry which comprises,
   (a) comminuting a first portion of coal and obtaining relatively coarse coal particles having a spectrum of sizes and at least 50 percent by weight of said particles having a size between 14 mesh and 48 mesh Tyler standard screen series, said coarse coal particles when mixed with water to form a slurry having a given concentration of coal particles by weight and when transported at said given concentration through a pipeline at a given velocity will have a first pressure drop per unit length of pipeline,
   (b) comminuting a second portion of coal and obtaining relatively fine coal particles having at least 75 percent by weight of said particles smaller than 200 mesh Tyler standard screen series, substantially all of said fine coal particles having a size larger than colloidal size, said fine coal particles when mixed with water to form a slurry of said concentration of coal particles by weight and when transported at said same concentration through said pipeline at said same velocity will have a second pressure drop per unit length of pipeline,
   (c) blending said coarse coal particles and said fine coal particles so that said blended product when mixed with water to form a slurry of said same concentration of coal particles by weight and when transported at said same concentration through said pipeline at said same velocity will have a third pressure drop per unit length of pipeline which is less than either said first or said second pressure drop,
   (d) preparing a slurry of said blended product and water comprising between 50 to 70 percent of said blended product of coal particles in water,
   (e) pumping said slurry through a long distance pipeline, and
   (f) recovering said slurry from the delivery end of said pipeline.

3. A system for transporting coal to distant places through a pipeline as a coal-water mixture comprising
   (a) obtaining particulate coal from a mine,
   (b) screening said particulate coal on a screen having openings of about 8 mesh Tyler standard screen series,
   (c) conducting said coal particles having a size less than 8 mesh Tyler standard screen series to a mixing tank,
   (d) comminuting said particulate coal having a size greater than 8 mesh to a nominal top size of about 4 mesh,
   (e) conducting said comminuted coal to said mixing tank,
   (f) obtaining fine coal having a nominal top size of about 100 mesh Tyler standard screen series,
   (g) mixing said fine coal with water to form a coal-water mixture,
   (h) conducting said mixture to a fine comminuting means,
   (i) comminuting said fine coal in said mixture so that about 80 percent of said fine coal has a size less than 200 mesh Tyler standard screen,
   (j) conducting said fine coal mixture from said fine comminuting means to said mixing tank,
   (k) adding sufficient water to said mixing tank to obtain a coal-water mixture having a concentration of about 60 percent coal by weight and water,
   (l) pumping said mixture through a long distance pipeline at a sufficient velocity to provide turbulent flow, and
   (m) recovering said mixture from the delivery end of said pipeline.

4. The system for transporting coal to distant places through a pipeline as a coal-water mixture which comprises
   (a) obtaining particulate coal from a mine,
   (b) screening said particulate coal on a screen having openings of about 8 mesh Tyler standard screen series, (c) conducting said particles having a size less than 8 mesh to a mixing tank, (d) comminuting said particulate coal having a size greater than 8 mesh to a nominal top size of about 4 mesh in the presence of a mixture of fine coal and water, (e) conducting said comminuted coal, fine coal and water mixture to said mixing tank, (f) obtaining fine coal having a nominal top size of about 100 mesh Tyler standard screen series, (g) mixing said fine coal with water to form a coal-water mixture, (h) conducting said mixture to a fine comminuting means, (i) comminuting said fine coal in said mixture so that about 60 percent of said coal particles have a size less than 325 mesh Tyler standard screen series and substantially all of said fine coal particles have a size greater than colloidal size, (j) conducting a portion of said mixture from said fine comminuting means to said first named comminuting means to concurrently comminute said coarse coal particles, (k) conducting a portion of said fine coal mixture to said mixing tank, (l) adding sufficient water to obtain a coal-water mixture having a concentration of about 60 percent coal by weight and water, (m) pumping said mixture through a long distance pipeline at a velocity sufficient to provide turbulent flow, and (n) recovering said mixture from the delivery end of said pipeline.

5. A system for transporting coal to distant locations through a pipeline as a coal-water mixture having relatively high stability under static conditions including the steps of:

(a) obtaining coal particles having a nominal top size of about 4 mesh Tyler standard screen series and a substantial portion of relatively coarse coal particles, said coal particles when mixed with water to form a mixture containing between about 50 and 60 percent by weight coal particles exhibits unstable characteristics in that under quiescent conditions the coal particles quickly settle out of the water and form a packed highly immobile bed, said settled mixture being highly resistant to flow, (b) obtaining relatively fine coal particles wherein a substantial portion of said particles have a size less than 325 mesh Tyler standard screen and substantially all of said fine coal particles are larger than colloidal size, (c) blending a sufficient amount of said relatively fine coal particles with said other coal particles so that when said blend is mixed with water to form a mixture containing between about 50 and 60 percent coal particles by weight, said mixture exhibits stable characteristics in that under quiescent conditions said mixture retains its fluidity and the coal particles remain mobile and exhibit a relatively low resistance to flow, (d) pumping said mixture through a long distance pipeline, and (e) recovering said mixture from the delivery end of said pipeline.

6. A system for transporting coal to distant locations through a pipeline which comprises (a) obtaining coal having a nominal top size of about 4 mesh Tyler standard screen series and more than 30 per cent by weight of coal particles having a size greater than 28 mesh Tyler standard screen series, (b) obtaining relatively fine coal particles which include a substantial portion of particles having a size less than 325 mesh Tyler standard screen series, (c) blending said fine coal particles and said other coal particles to obtain a blend having at least 20 percent by weight of particles having a size less than 325 mesh Tyler standard screen series, (d) preparing a mixture of said blend and water comprising between 55 and 65 percent by weight coal in water, (e) pumping said mixture through a long distance pipeline at a velocity sufficient to provide turbulent flow, (f) and recovering slurry from the delivery end of said pipeline.

7. A system for transporting coal to distant locations through a pipeline which comprises (a) obtaining particulate coal having a spectrum of sizes and at least 25 percent by weight of said particulate coal having a size between 4 mesh and 28 mesh Tyler standard screen series and at least 30 percent by weight of said particulate coal having a size less than 200 mesh Tyler standard screen series, said entire particulate coal spectrum when mixed with water to form a coal-water slurry and when transportation will have a pressure drop per unit length of pipe that is less than the pressure drop of a slurry of said 4 mesh x 28 mesh fraction or the —200 mesh fraction when said fractions are transported separately through a pipeline under the same conditions, (b) preparing a slurry of said particulate coal and water comprising between 55 and 65 percent by weight coal in water, (c) pumping said slurry through a long distance pipeline at a velocity sufficient to provide turbulent flow, (d) and recovering slurry from the delivery end of said pipeline.

8. A system for transporting coal to distant locations through a long distance pipeline which comprises.

(a) obtaining particulate coal having a spectrum of sizes and at least 25 percent by weight of coal particles of a size between 4 mesh and 28 mesh Tyler standard screen series and about 30 percent by weight of particles having a size between 28 mesh and 100 mesh Tyler standard screen series and at least 20 percent by weight of particles having a size less than 325 mesh Tyler standard screen series, said entire spectrum of particulate coal when mixed with water to form a coal-water slurry and when transported through a pipeline at a given velocity and concentration will have a pressure drop per unit length of pipeline less than the pressure drop of a slurry of said 4 mesh x 28 mesh fraction, said 28 mesh x 100 mesh fraction or said —325 mesh fraction when said fractions are transported alone through a pipeline under similar conditions, (b) preparing a slurry of said particulate coal and water comprising between 55 and 65 percent by weight coal in water, (c) pumping said slurry through a long distance pipeline at a velocity between 3 and 7 feet per second, and (d) recovering slurry from the delivery end of said pipeline.

References Cited in the file of this patent
UNITED STATES PATENTS

| | | |
|---|---|---|
| 2,791,471 | Clancey et al. | May 7, 1957 |
| 2,791,472 | Barthaner et al. | May 7, 1957 |
| 2,920,923 | Wasp et al. | Jan. 12, 1960 |

UNITED STATES PATENT OFFICE
CERTIFICATE OF CORRECTION

Patent No. 3,168,350                 February 2, 1965

John A. Phinney et al.

It is hereby certified that error appears in the above numbered patent requiring correction and that the said Letters Patent should read as corrected below.

Column 2, line 28, for "statistically" read -- statically --; column 4, line 29, for "quiecent" read -- quiescent --; column 5, line 8, for "where" read -- were --; column 6, line 72, for "separat" read -- separate, --; column 8, line 75, for "deliverying" read -- delivering --; column 12, line 26, for "transportation" read -- transported through a pipeline at a given velocity and concentration --.

Signed and sealed this 6th day of July 1965.

(SEAL)
Attest:

ERNEST W. SWIDER                     EDWARD J. BRENNER
Attesting Officer                      Commissioner of Patents